Jan. 13, 1953 — O. CESAREO — 2,625,328
AUTOMATIC CODE TRANSLATING SYSTEM
Filed Dec. 17, 1946 — 11 Sheets-Sheet 4

FIG. 5

INVENTOR
O. CESAREO
BY
ATTORNEY

FIG. 6

INVENTOR
O. CESAREO
BY John A. Hall
ATTORNEY

Jan. 13, 1953     O. CESAREO     2,625,328

AUTOMATIC CODE TRANSLATING SYSTEM

Filed Dec. 17, 1946     11 Sheets-Sheet 6

FIG. 7

INVENTOR
O. CESAREO
BY
ATTORNEY

O. CESAREO 2,625,328

AUTOMATIC CODE TRANSLATING SYSTEM

Filed Dec. 17, 1946

INVENTOR
O. CESAREO
BY John A. Hall
ATTORNEY

FIG. 12

Patented Jan. 13, 1953

2,625,328

UNITED STATES PATENT OFFICE 2,625,328

AUTOMATIC CODE TRANSLATING SYSTEM

Orfeo Cesareo, Washington Township, Bergen County, N. J., assignor to Bell Telephone Laboratories, Incorporated, New York, N. Y., a corporation of New York Application December 17, 1946, Serial No. 716,753

2 Claims. (Cl. 235—61)

This invention relates to calculators and particularly to electrical devices by which mathematical calculations may be carried out by the movement of simple electromagnetic means without the use of gear trains, number wheels, cams or other mechanical elements.

An object of the invention is to provide calculating means which will perform long and complicated operations in a minimum of time and with a minimum of apparatus.

Another object is to promote economy by adapting as far as possible known and reliable communication apparatus. In accordance with this object a standard printer of the type used in printing telegraph systems is used as a means for recording and displaying the calculated results as well as the statement of the problems and lists of arguments and other pertinent data.

A principal object of the invention is to provide means whereby the recorded results will be automatically printed in their correct form. In many calculators the results obtained are at times in the form of complements and must needs therefore be recognized as complements and then translated. In other words the user of the machine must be constantly on guard lest he mistake a result as a natural number whereas it is a complement. The object of the present arrangement is to automatically translate such results so that the record will always be in proper form and no examination of other factors need be considered to discover whether the recorded result is straightforward or inverted.

For the purposes for which the device of the present invention is used the end result of the calculations is a number whose character may always be recognized by its value. Let us consider the addition and subtraction of five digit numbers by way of example. A six digit register is employed so that the carry-out may be registered as well as the sum or the remainder. We have as a first example the addition of two numbers—as follows:

```
  1 2 3 4 5
  0 0 0 0 1
  ---------
  1 2 3 4 6
``` but provision must be made for signs, so we let 0 represent plus and 9 represent minus—hence this sum becomes

```
0 1 2 3 4 5
0 0 0 0 0 1
-----------
0 1 2 3 4 6
``` in which it is seen that the augend, the addend and the sum are all positive values.

Now suppose we wish to subtract 00001 from the first number. By using the nine's complement method we have this sum

```
0 1 2 3 4 5
9 9 9 9 9 8
            1 (the fugitive one)
-----------
0 1 2 3 4 4
```

Again suppose we wish to add two numbers of differing sign, as

```
+1 2 3 4 5
-1 2 3 4 4
----------
+0 0 0 0 1
``` we should then have to use a complement, since this actually becomes subtraction, so that the sum would appear as

```
0 1 2 3 4 5
9 8 7 6 5 5
            1 (the fugitive one)
-----------
0 0 0 0 0 1
```

Once again suppose we wish to subtract a number from one smaller than itself so that our net result is a minus quantity, as

```
  1 2 3 4 5
 -1 2 3 4 6
  ---------
 -0 0 0 0 1
``` by using the complement our sum appears as

```
0 1 2 3 4 5
9 8 7 6 5 3
-----------
9 9 9 9 9 8
``` but this is in the form of a complement and it actually represents

```
-0 0 0 0 1
```

The present invention provides means whereby if the end result of a calculation is in its complemental form as

```
9 9 9 9 9 8
``` above, it will nevertheless be printed in its ordinary form, as

```
-0 0 0 0 1
```

Now this method is valid so long as the numbers that are handled are small, that is when there is no doubt that 9 9 9 9 9 8 is a complement and does not actually represent

—9 9 9 9 8

Since the device of the present invention in a specific embodiment is adapted to calculate errors and an error is always reasonably small we can therefore say that a six digit number beginning with 0 to 4 inclusive is a positive number and one beginning with 5 to 9 inclusive is a negative number. While we may use 0 to represent plus and 9 to represent minus whenever we record a number, we nevertheless consider any calculated number beginning with one of the digits 0 to 4 inclusive as positive and any calculated number beginning with one of the digits 5 to 9 inclusive as negative.

In the present device the biquinary system of number representation is used, in which there is one relay operated for all numbers 0 to 4 inclusive and another relay operated for all numbers 5 to 9 inclusive. It, therefore, becomes a simple matter to control the printing of numbers in their proper form. Any number which is the end result of a calculation is printed in the form calculated if its first digit has its 0 to 4 relay operated but is inverted, because it is a complement, if its first digit has its 5 to 9 relay operated.

It should be particularly noted through the above examples that this first digit of a multi-digit number enters into the methematical operations in the usual manner and only loses its identity as a digit when it is translated to be printed.

It has also been found, that in one class of calculations it is more expedient to calculate errors with the wrong sign and then to invert the sign at the termination of the calculations. Therefore it is arranged to automatically print the numbers with the sign inverted. Thus a number, the end result of a calculation, such as 0 1 2 3 4 5 would in a first class of operations be printed as

—1 2 3 4 5 and in a second class of operations be printed as

+1 2 3 4 5

Likewise a number, which appeared as a complement in its calculated form such as 9 8 7 6 5 4 would in a first class of operations be printed as

+1 2 3 4 5 and in a second class of operations be printed as

—1 2 3 4 5

It will thus be seen that the first digit of a calculated number will control the form in which the following digits will be printed irrespective of the manner in which such first digit may be translated for printing.

The drawings consist of eleven sheets having twelve figures, as follows:

Fig. 1 and Fig. 2 taken together with Fig. 1 placed above

Fig. 3 is a schematic circuit diagram showing briefly the essential elements forming the novel combinations of the present invention;

Fig. 4, on the same sheet with Fig. 3, is a block diagram showing how Figs. 5 to 11 inclusive may be placed to form a comprehensive circuit diagram, in which

This application is one of a group of seven applications all based on the same arrangement. The Andrews-Vibbard application is a full and complete disclosure and includes a disclosure of the present invention, the other applications including the present application being abbreviated disclosures of certain features of the complete device, as follows:

| Applicant | Serial number | Filing date | Subject |
|---|---|---|---|
| Andrews-Vibbard 2-4 | 716,680 | Dec. 17, 1946 | Automatic calculator. |
| Vibbard 5 | 716,827 | _____do_______ | Control circuit. |
| Strickler 14 | 716,783 | _____do_______ | Testing system. |
| Juley 4 | 716,793 | _____do_______ | Switching Control system. |
| Andrews 3 | 716,762 | _____do_______ | Calculator sign control circuit. |
| Cesareo et al. 16-15 | 716,754 | _____do_______ | Automatic calculator. |

The device in which the present invention is incorporated is a calculator operated by electrical circuit change in which each new circuit operation is dependent upon the successful completion of a previous operation. It consists essentially of a calculating arrangement, a plurality of tape transmitters of the kind commonly used in printing telegraph operation for entering both operational orders and mathematical information, a plurality of registers in which mathematical information from the tapes or calculated by the calculator may be stored temporarily and a printing device also of the type commonly used in the printing telegraph art for recording various items of information, including the arguments of the problems, partial results and the final solutions.

Figure 1:
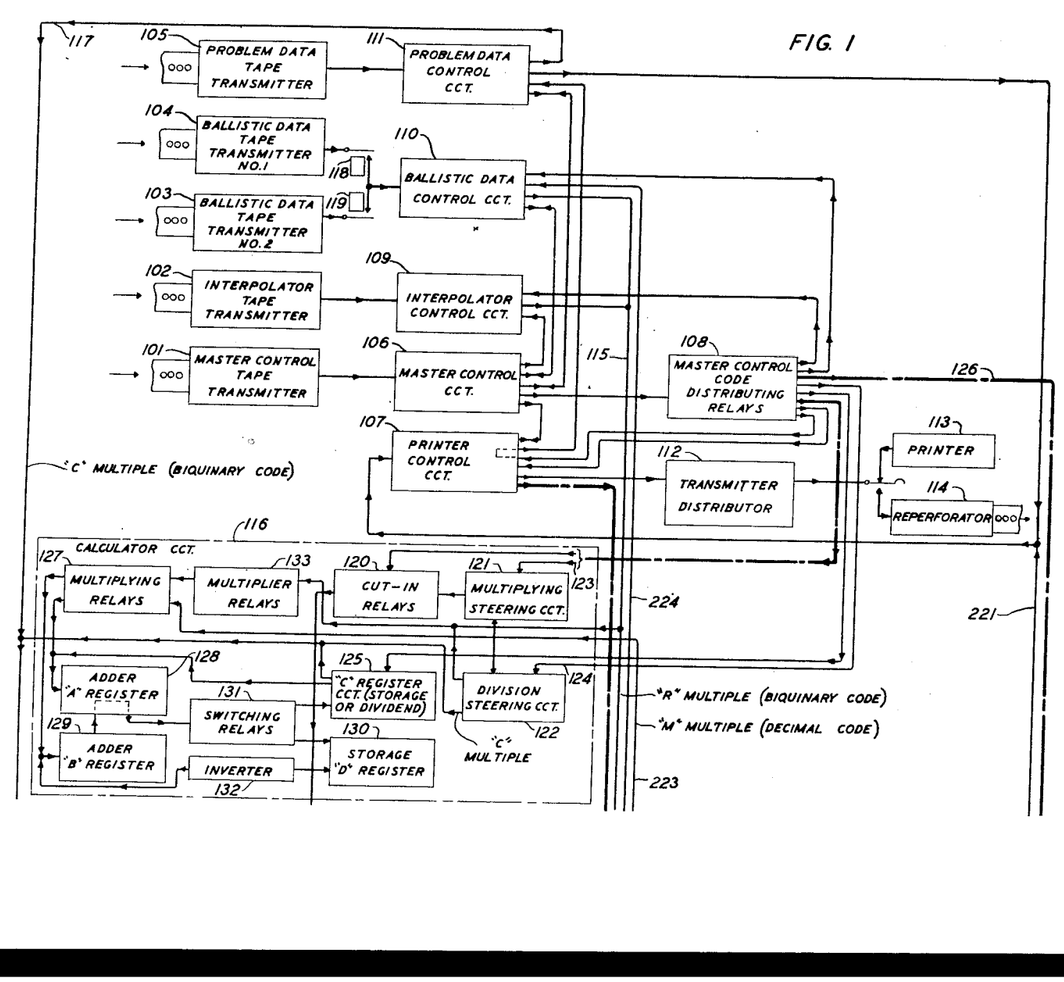

In Fig. 1 there is shown a master control tape transmitter 101 which is used to transmit operational orders from a so-called routine tape into the master control circuit 106 which has general control over all the operations of the device. Other similar transmitters are the interpolator tape transmitter 102, the ballistic data tape transmitters 103 and 104 and the problem data tape transmitter 105, each with its control circuit. All of these transmit mathematical information from appropriate tapes and all of this information is generically problem data. That provided by the problem data tape constitutes the arguments of the problem, that from the interpolator tape constitutes corelated or empirical data and that from the ballistic tapes constitutes table information or pre-calculated data such as is usually found in the so-called tables of functions such as trigonometric, logarithmatic, ballistic and other such data. In the operation of this device the routine tape is operated cyclically, that is, it runs through its transmitter over one complete set of routine orders necessary for the calculation of a function from one given argument or set of arguments. The problem data tape usually contains a series of arguments and is moved forwardly step by step under control of the master control circuit, the master tape operating through one cycle for each argument. The remaining tapes contain necessary information and may be moved from point to point either forwardly or backwardly to transmit information called for by the master control from time to time during the calculating operations.

The calculator here generally shown as included in the broken line rectangle 116, consists primarily of four relay registers, the A register 128 constituting an augend element, the B register 129 constituting an addend element and the C register 125 and D register 130 being used alternatively as sum elements. All problems presented to the calculator are in the form of problems in multiplication and the calculation is actually performed by summing the values registered at various times in the A and B registers. For this purpose a set of multiplying relays 127 and a set of multiplier relays 133 are provided by means of which a multiplicand operating the multiplying relays 127 may be multiplied by one digit at a time of the multiplier which operates the multiplier relays 133. There is provided a set of switching relays 131 for determining into which register, the C register 125 or the D register 130 the values in the A and B registers shall be summed. Values stored in the D register 130 may be transferred only to the B register 129, by way of an inverter 132. This is a means by which the value being transferred from the D register to the B register may be transferred as it is or in its complemental form. Values stored in the C register 125 may be transferred either to the A register or transmitted out over the C multiple 117 for transfer to any one of the various registers shown in Fig. 2.

Figure 2:
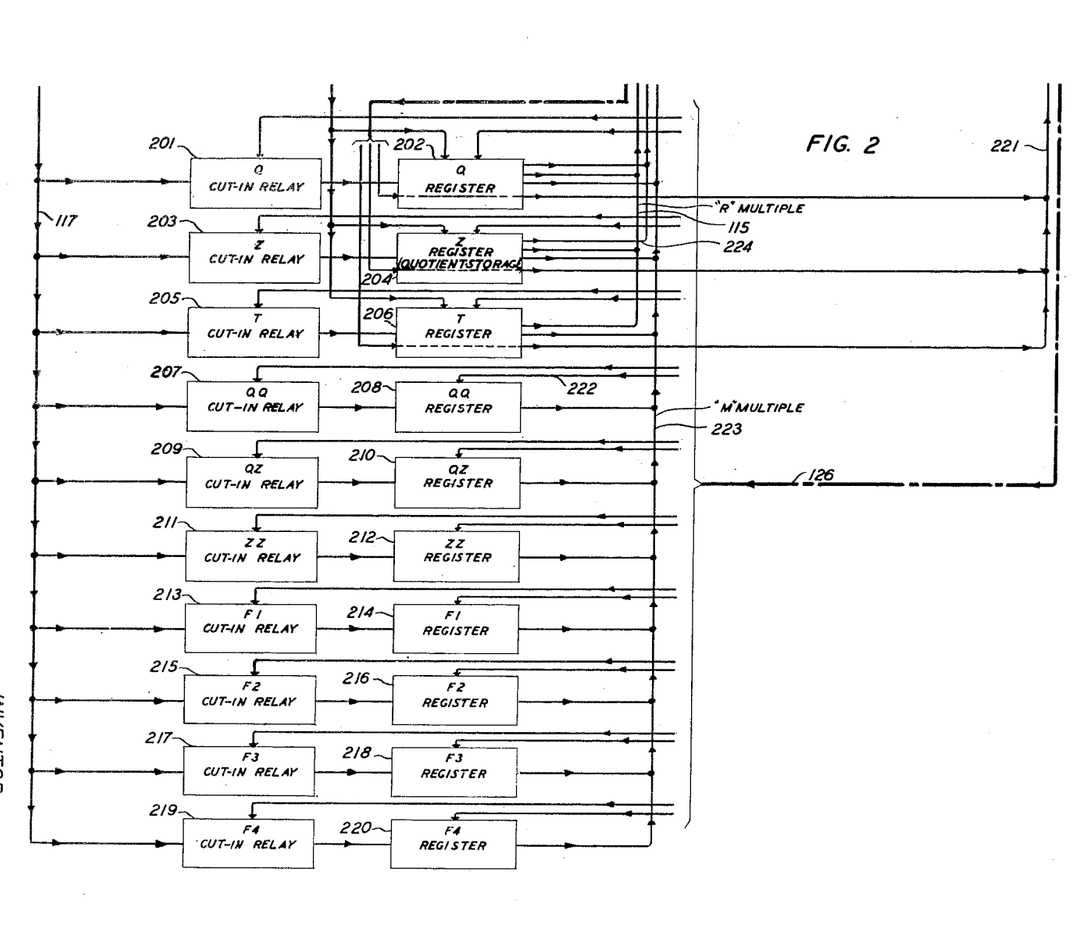
Fig. 2 is a flow chart indicating the manner in which the device in which the present invention is incorporated is operated.

The calculator 116 is under general control of a steering circuit 121 which controls the various steps in a multiplying calculation cycle. When a problem in division is presented an additional circuit, the division steering circuit 122 is brought into action to make the necessary changes and alterations in the calculating cycle. The cut in relays 128 ordered into operation by the master control circuit 106 through the code distributing relays 108 operate to activate one decimal denominational order at a time of certain registers which then transmit over the R multiple 115 to operate the multiplier relays under control of the steering circuit 121. The division steering circuit, ordered into operation over the path 124, besides modifying the calculation cycle provides a supply of multiplier digits over the R multiple 115 to the multiplier relays 133 as trial quotient digits and transmits the correctly calculated quotient digits over the C multiple 117.

The novel combinations of the present invention concern generally the arrangements for recording the end results of the calculations. In a specific embodiment of the invention such calculated numbers are temporarily deposited in the T register from which the printer control circuit 107 orders them translated and transmitted by the transmitter distributor 112 to either the printer 113 or the reperforator 114. It may be noted that the reperforator may be used to prepare table tapes, that is the calculating device may be used to calculate values of ballistic constants or other values which will be used in solving other problems so that by transmitting the calculated information to the reperforator 114 instead of to the printer 113, a tape may be prepared suitable for use in one of the table tape transmitters such as one of the ballistic tape transmitters. Of course such a tape at any time thereafter may be run through a tape transmitter and a printer to produce a printed record of the calculated information. The means of the present invention is especially useful in this connection since it is desirable to enter all numbers into the calculator in their normal or natural form and not in the form of complements.

Figures 3, 4:
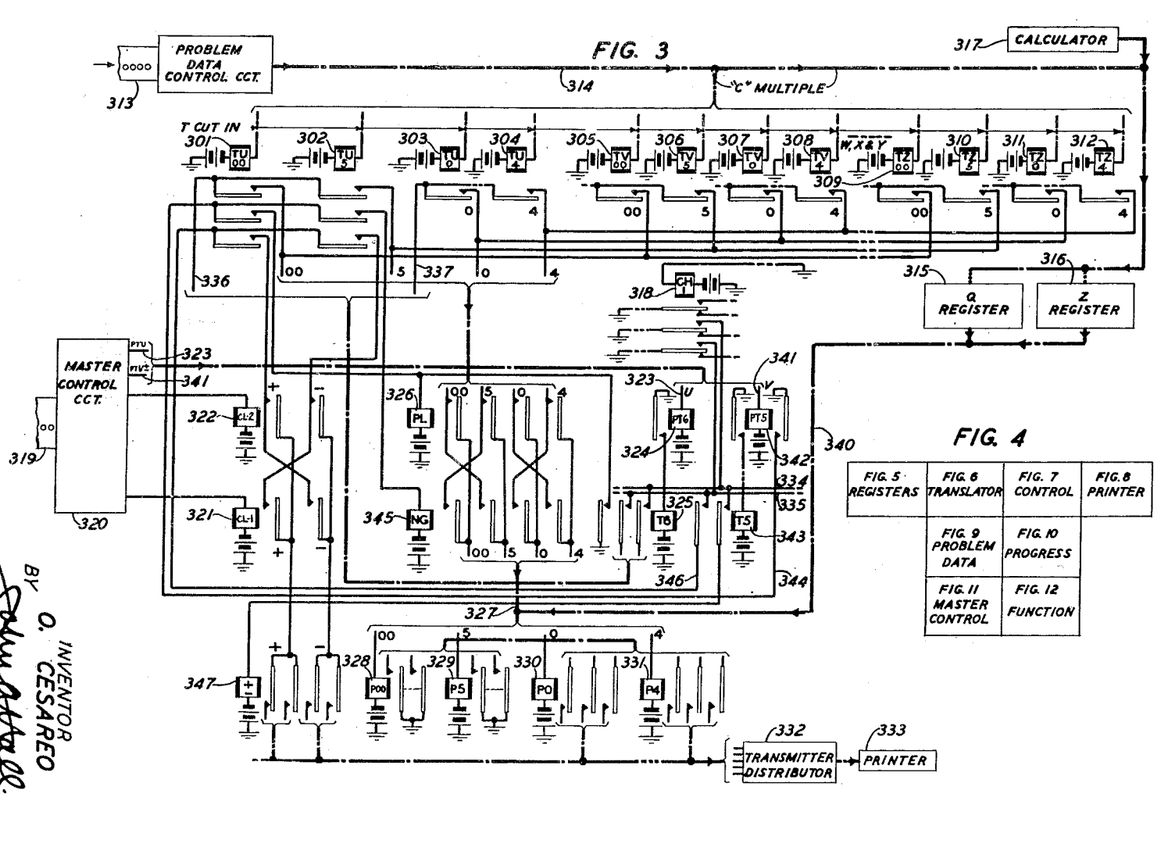

Fig. 3 is a schematic circuit diagram to show briefly the essential elements forming the novel combinations of the present invention. All of these elements are set forth in more detail hereinafter and in still more detail in the said Andrews-Vibbard application.

Relays 301 to 304 represent the U or first decimal denominational order of a relay register (the T register), relays 305 to 308 represent the V or second order thereof and relays 309 to 312 represent the Z or sixth order thereof. There are seven relays in each order divided into a binary group of two relays designated 00 and 5 and a quinary group of five relays designated 0, 1, 2, 3 and 4. Any one of the ten digits may be represented by the operation of one relay from each group. Thus, the digit 2 is represented by the operation of the 00 relay of the binary group and the 2 relay of the quinary group and likewise the digit 8 is represented by the operation of the 5 relay of the binary group and the 3 relay of the quinary group. The value of the digit is equal to the sum of the two numbers used to designate the two relays which are operated. The other relays of each order and the relays of the other orders are not shown. The Q and Z registers 315 and 316 are indicated by blocks.

Numbers may be read from the problem data tape 313 into the C multiple 314 or from the calculator 317 into the C multiple to set the T, Q or Z registers. Generally speaking numbers which are read from the tape into the T register and are then printed without change, that is, as six digit numbers but those which are deposited in the T register from the calculator as the end result of a calculation are printed as five digit numbers preceded by a plus or a minus sign and if as deposited they are in the form of complements will be inverted and printed in their true forms.

Generally throughout the calculating device where a plurality of operations are to be sequentially performed the control of this sequence resides in a progress circuit or steering chain. In the present case the six digits deposited in the T register must be sequentially transmitted to the transmitter distributor leading to the printer and hence a steering chain is provided the first relay only of which is here shown as CH-1 relay 318. This relay when operated will activate the circuits through the U order relays of the T register.

In the operation of the calculating device the whole sequence of operations is controlled by the master or routine tape 319 through the master control circuit 320. The initial order issued by the routine tape is to operate a class relay, of which two are here shown, the CL-1 relay 321 and the CL-2 relay 322. When one of these relays has properly responded to the order for its operation it returns a satisfaction signal to which the master control circuit responds by advancing the routine tape 319 and issuing the next routine order.

Now one of the routine orders which may be issued is "to print the number stored in the T register starting with the U order." This order is issued through a ground placed on the PTU lead 323 by the master control circuit. This will result in the operation of the PT-6 relay 324 which in turn will operate the T6 relay 325. The plus PL relay 326 responds to the operation of the T6 relay 325 and connects the seven biquinary leads multipled to the corresponding relays of each of the six orders of the T register to the corresponding seven biquinary leads included in the bundle 327 leading to the translator. The translator consists of a set of seven biquinary relays including the P00 relay 328, the P5 relay 329, the P0 relay 330 and the P4 relay 331 which may be operated in accordance with the biquinary code and which in turn will place grounds on the five conductors leading to the segments of a conventional printing telegraph transmitter distributor 332 to transmit the conventional printing telegraph codes to the printer 333. The particular codes used are the ten codes each having three marking signals and two spacing signals as indicated by the three armatures of each of the quinary relays 330 and 331.

In due time the chain start ground will be established and will result in the operation of the first steering chain relay 318. Thereupon the leads 334 and 335 will be grounded and since relay 325 is operated this will result in the grounding of the U order activate leads 336 and 337. Now in accordance with the setting of the relays of the U order of the T register the corresponding relays of the translator will be operated and the digit represented thereby will be transmitted and printed. Through means not shown here the completion of the transmission of this digit will cause an advance whereby the next steering chain relay will operate. This will ground another pair of leads now connected through the armatures of the T6 relay 325 to affect the activate leads 338 and 339 of the V order of the T register whereby the digit stored therein will be transmitted and printed. The remainder of the six digits in the T register will be likewise transmitted and printed.

Another routine order may result in the transmission over the trunk 340 of the numbers stored in the Q and Z registers by translation, transmission and printing.

Still another routine order which may be issued will result in the grounding of the PTV± lead 341 which will result in the operation of the PT5 relay 342 and the T5 relay 343. This order directs that the number in the U order of the T register be translated to a + or − sign and that the remaining digits in the T register starting with the V order be printed. Means are provided so that the five digits printed will be printed without change if this five digit number is in its natural form but will be inverted and printed in its natural form if it is stored in its complemental form. Further means are provided so that if the class 2 relay is operated the sign will be printed as registered but if the class 1 relay 321 operated the sign will be inverted before being printed.

In this instance the PT-5 relay 342 will ground the lead 344 so that if the TU00 relay 301 is operated, indicating one of the digits 0 to 4, then the plus relay PL will be operated but if the TU5 relay 302 is operated, indicating one of the digits 5 to 9, then the negative relay 345 will be operated. The negative relay inverts the digit in its transmission from the T register to the translator. Also the T5 relay 343 will ground the activate lead 346 whereby the digit in the U order of the T register will be transmitted through the sign inverter controlled by the class relays 321 and 322. The T5 relay 343 also causes the operation of the (±) relay 347 to cause the binary registration of the first digit to be translated into the proper code for transmission to the printer 333.

These operations may be illustrated by pointing out that if the number $$9\ 8\ 7\ 6\ 5\ 4$$

is registered in the T register it will be printed as follows:

|  | Under code PTU | Under code PTV± |
| --- | --- | --- |
| Class 1 | 9 8 7 6 5 4 | + 1 2 3 4 5 |
| Class 2 | 9 8 7 6 5 4 | − 1 2 3 4 5 |

The schematic circuit diagram shown in Figs. 5 to 12 inclusive arranged as indicated in Fig. 4 is an elaboration of the schematic of Fig. 3 showing many of the circuits described in connection with Fig. 3 in great detail. Nevertheless, even here the showing is not complete though the circuits are believed to be clearly indicated. For instance in Fig. 5 the T, Q and Z registers are only indicated. The T register is one having six decimal denominational orders each consisting of a biquinary group of seven relays. The relays TU00, TU5, TU0 and TU4 represent the seven relays of the U order of the T register which are generally designated 00, 5, 0, 1, 2, 3 and 4, respectively and which operated in pairs, one from the binary group 00, and 5 and one from the quinary group 0, 1, 2, 3 and 4 represent a digit whose value is the sum of the numbers used as the designations of these relays. In the same manner the V and Z orders of the T register, the V and Z orders of the Q register and the V and Z orders of the Z register are indicated. The inverter by which a digit represented in the biquinary code may be inverted into its nine's complement is indicated by the positive and negative relays. The inverting means for the binary portion is complete but the equivalent means for the quinary portion is only indicated. Thus in inversion > 00 becomes 5
> 5 becomes 00
> 0 becomes 4
> 1 becomes 3
> 2 becomes 2
> 3 becomes 1
> 4 becomes 0 whereby, by way of example the digit 8, represented by the operation of the 5 and 3 relays becomes the digit 1, represented by the operation of the 00 and 1 relays (beyond the inverter).

In the operation of the device in which the present invention is incorporated and which is disclosed in complete detail in the said Andrews-Vibbard application, a master or routine tape is provided to have general control of the sequence of operations therein. The master control circuit issues orders, each one of which upon completion terminates in the transmission to the master control circuit of a satisfaction signal which results in the advance of the routine tape and the transmission of the next order in sequence. The master or routine tape is in the form of an endless loop and normally or in the event of trouble moves to an end of cycle position from which it advances in a new cycle. The first code position on this tape is a blank and is known as the priming operation. When the tape has been moved to this position it cannot move therefrom until the calculating device as a whole, which means each component thereof is primed or in a proper ready condition.

Figure 9:
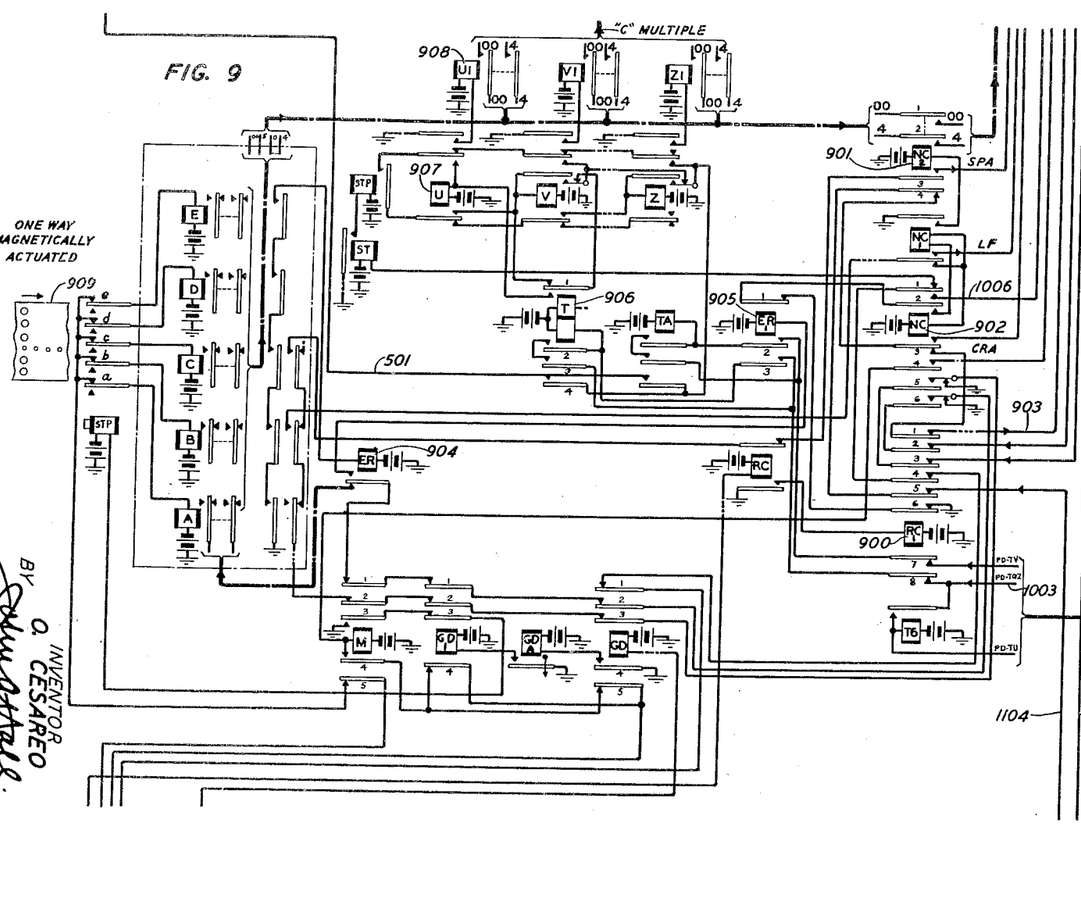
Fig. 9 shows certain details of the problem data control circuit.
Figure 10:
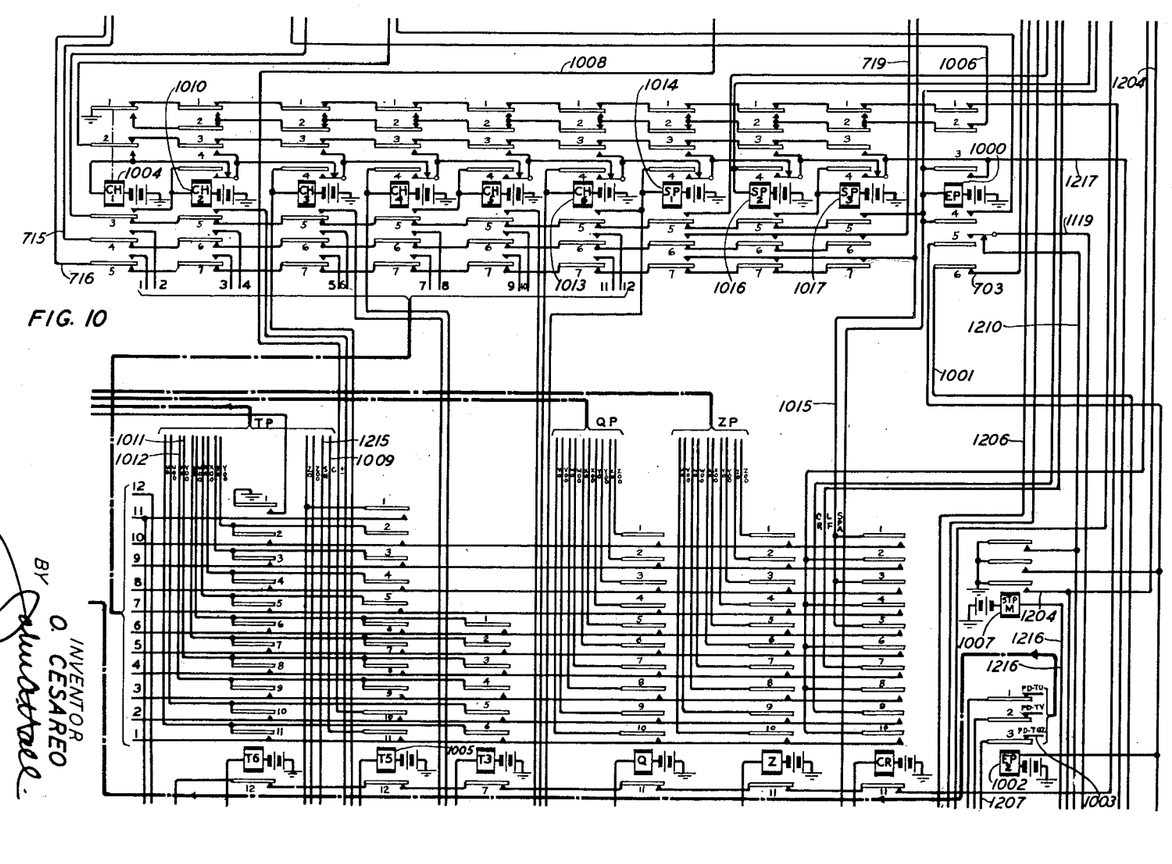
Fig. 10 shows the steering chain for successively activating the various decimal denominational orders of the various registers from which registered numbers may be transferred, translated and transmitted to the printer and also shows certain steering chain control relays selectively responsive to routine orders issued by the master control circuit.
Figure 11:
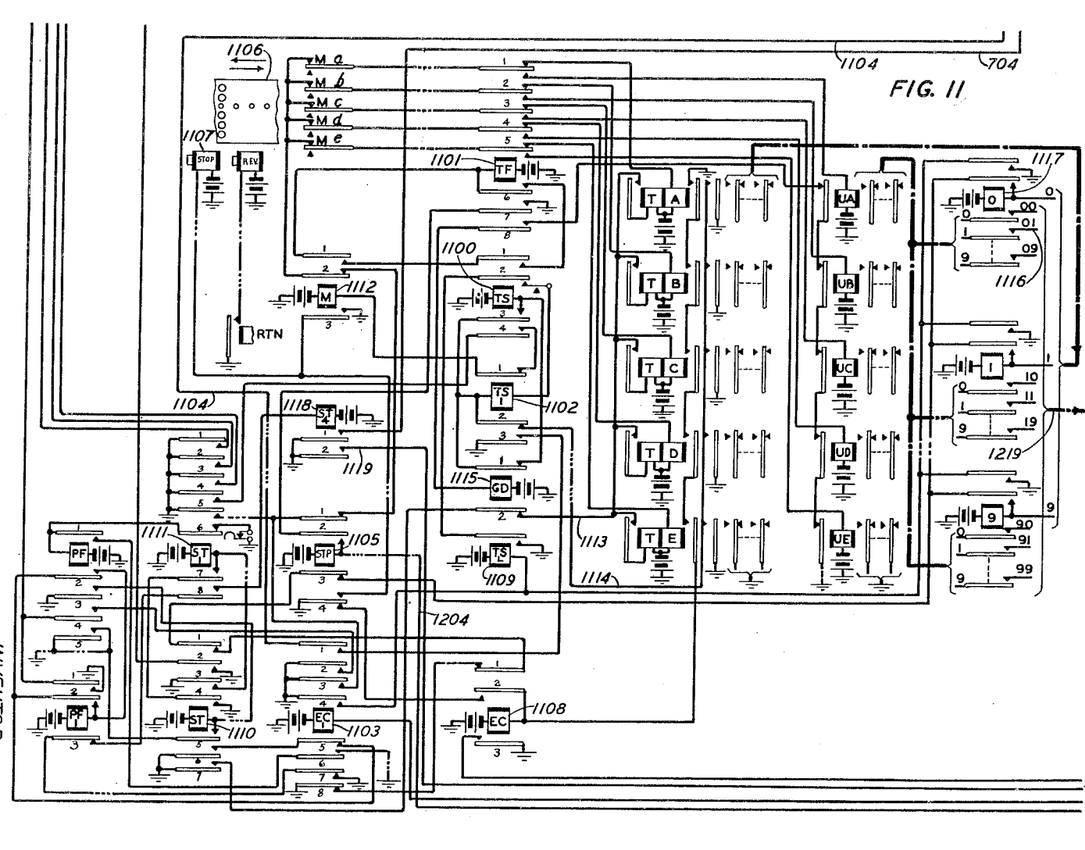
Fig. 11 shows certain details of the master control circuit.

This may be noted by considering the circuits of Fig. 11. The blank code is always arranged to be read as a units code of a two digit combination. Hence after a tens code has been read the tens switching TS relay 1100 operates, the transfer TF relay 1101 operates and when conditions are ready for reading the units code into the units relays, the TS-1 relay 1102 operates. Thereupon a circuit is established from ground armature 3 and front contact of TS-1 relay 1102, front contact and armature 1 of EC-1 relay 1103, the NC conductor 1104 which may finally be traced to the STP relay 1105 to advance the tape 1106 to the next code. The NC circuit is known as the new course circuit and will be completely closed only when the various component circuits of the complete device are ready to proceed. Assuming then that the various circuits have been driven to their proper starting conditions this extensive circuit may be traced from conductor 1104, over the back contact and armature 5 of the auxiliary recycle relay of the problem data control circuit RC-1 relay 900 armature 4 and back contact of NC-2 relay 901, armature 3 and back contact of NC relay 902, armature 1 and back contact of RC-1 relay 900, conductor 903, the down check circuit of the class relays in Fig. 7, including in series a back contact and armature of each of the class relays 700, 701 and 702, conductor 703, the back contact and armature 6 of the EP relay 1000 (end of progress relay) conductor 1001, back contact and armature 10 of EP-1 relay 1200, thence through similar check circuits in the ballistic data control circuit 1201 and the interpolator control circuit 1202 to the NC-1 conductor 1203 which finally connects to the STP conductor 1204 leading to the STP relay 1105. The closure of this circuit guarantees that the calculating device as a whole is ready to proceed to the calculation of a function.

The operation of the STP relay through its operation of the stop magnet 1107 moves the tape to its next code, the tens digit of a two digit number. By the movement of its armature 4 the relay 1105 releases the EC relay 1108 and this in turn releases the EC-1 relay 1103. Thereupon the TSL relay 1109, the TS relay 1100, the TF relay 1101 and the TS-1 relay 1102 are released, the TF relay 1101 in turn releasing the STP relay 1105 thus leaving the master control circuit in normal condition, with only the start relays, ST relay 1110 and ST-1 relay 1111 operated.

A circuit may now be traced from ground, armature 5 and front contact of ST-1 relay 1111, armature 1 and back contact of STP relay 1105, back contact and armature 2 of the M relay 1112 to the marking contacts of the tape transmitter whereby the code now positioned therein is read over the back contacts of the transfer relay 1101 into the tens relays, a thereby selected number of which operate and lock to conductor 1113. When the tens relays have been properly operated a ground will be placed on conductor 1114, the back contact and armature 2 of TS-1 relay 1102, the armature 1 and back contact of GD relay 1115 to the winding of TS relay 1100. Relay 1100 operates and among other duties closes a circuit from armature 4 of ST-1 relay 1111 to operate the M relay 1112 which causes the stop magnet to operate to advance the tape to the units digit of the code now being read. The M relay closes a circuit for the TF relay 1101 which transfers the transmitter fingers to the units relays. Relay 1101 through its armature 8 closes a circuit from the GD relay 1115 to the down check circuit of the units relays so that if and when these relays are all properly released the GD relay 1115 will operate to release the tens relays and at the same time cause the operation of the TS-1 relay 1102 through opening the original energizing circuit for TS relay 1100. When TS-1 relay operates the M relay 1112 is released and ground is again placed on the marking contacts of the transmitter to read the code from the tape into the units relays. These properly operated will ground one of the code leads through the operated code relay which has responded to the tens relays such as code lead 1116 closed by relay 1117.

Now it need only be mentioned further in relation to the master control circuit that the grounding of a lead such as the lead 1116 constitutes the issue of an order. The master control circuit will therefore remain in the condition now attained until this order has been carried out whereupon a satisfaction signal (a ground placed on the STP lead 1204) will cause the master control transmitter to advance.

Figure 7:
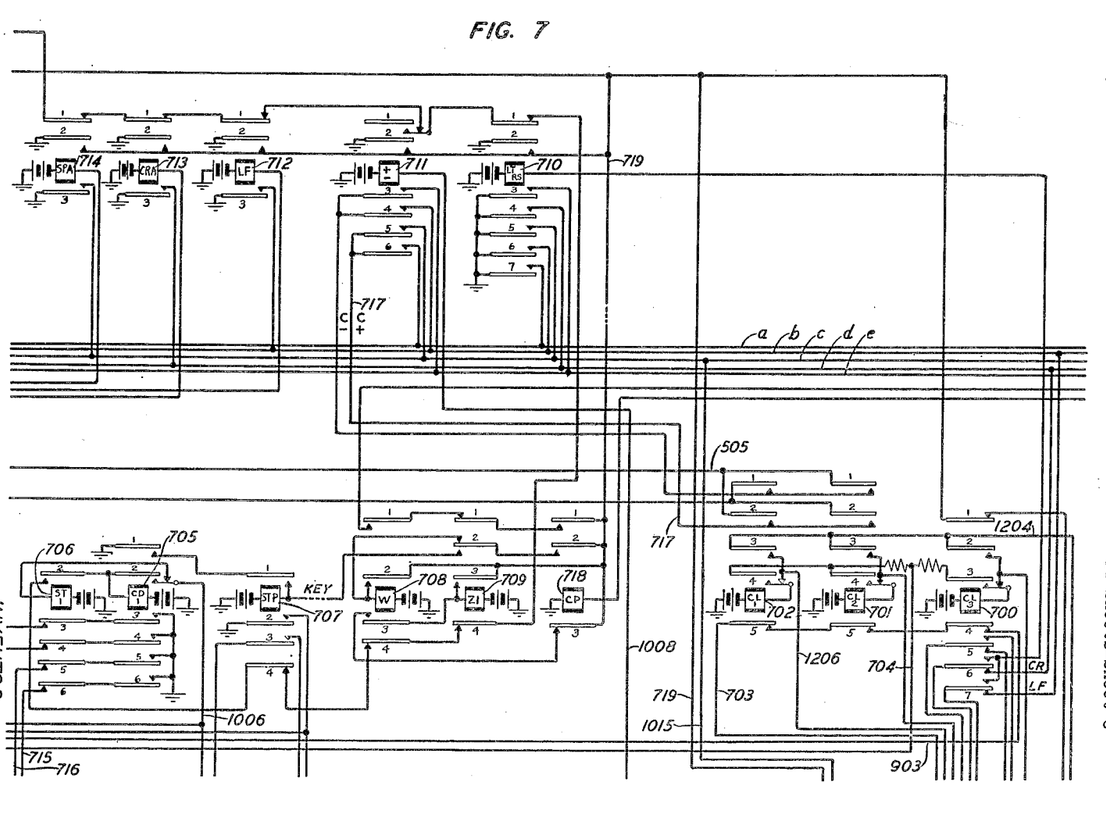
Fig. 7 shows certain function relays for transmitting function codes to the printer, the class relays and certain of the starting control relays.
Figure 12:
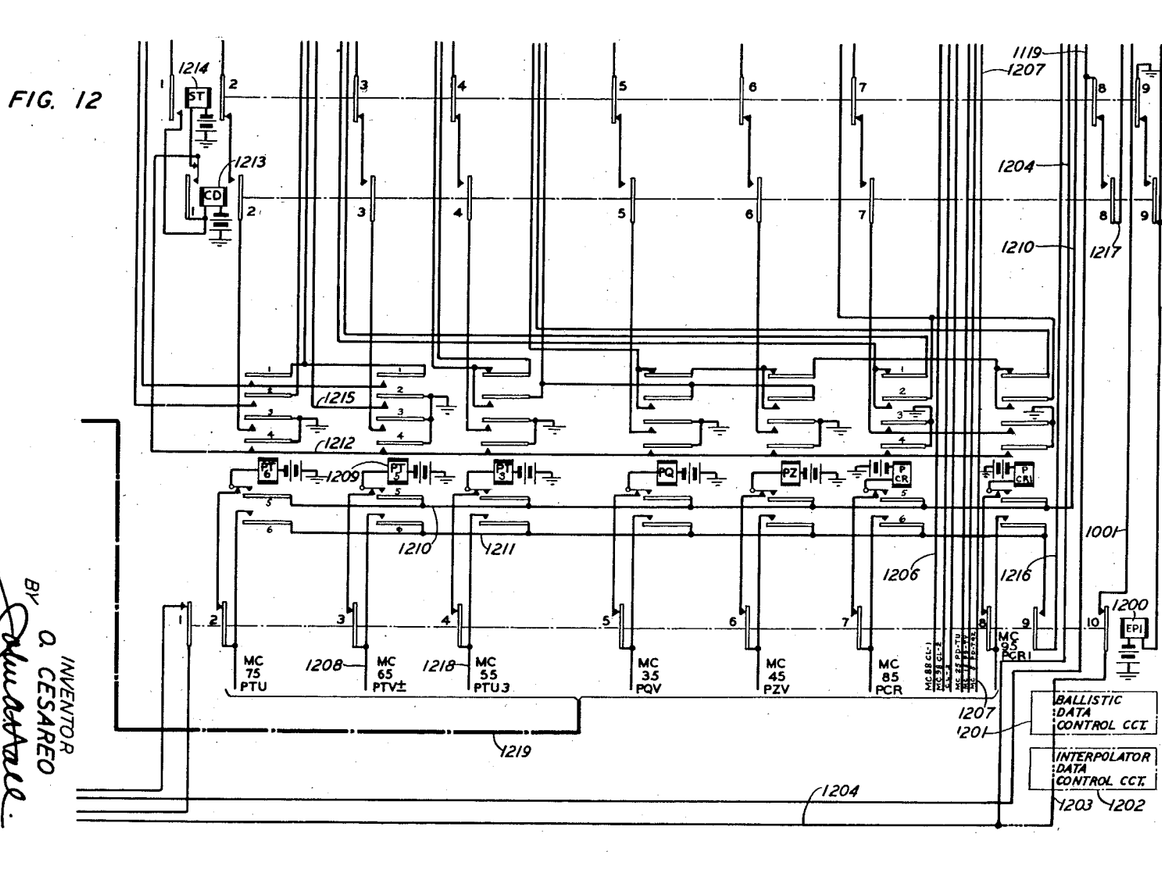
Fig. 12 shows the relays directly responsive to the routine orders and which control the steering chain control relays of Fig. 10.

In a typical example of the use of the calculating device fully described in the said Andrews-Vibbard application, the first order to be issued is one designating the class of operations that will be performed. A code lead such as 1116 will be grounded leading to a class relay, such for example as the lead 1206, leading to CL-1 relay 702. This relay would then operate and lock to conductor 704, which will be found grounded at a front contact of the ST-4 relay 1118. The proper operation of the class relay will extend the ground for its operation to conductor 1204 as a satisfaction signal whereupon the master control tape will be advanced.

Figure 5:
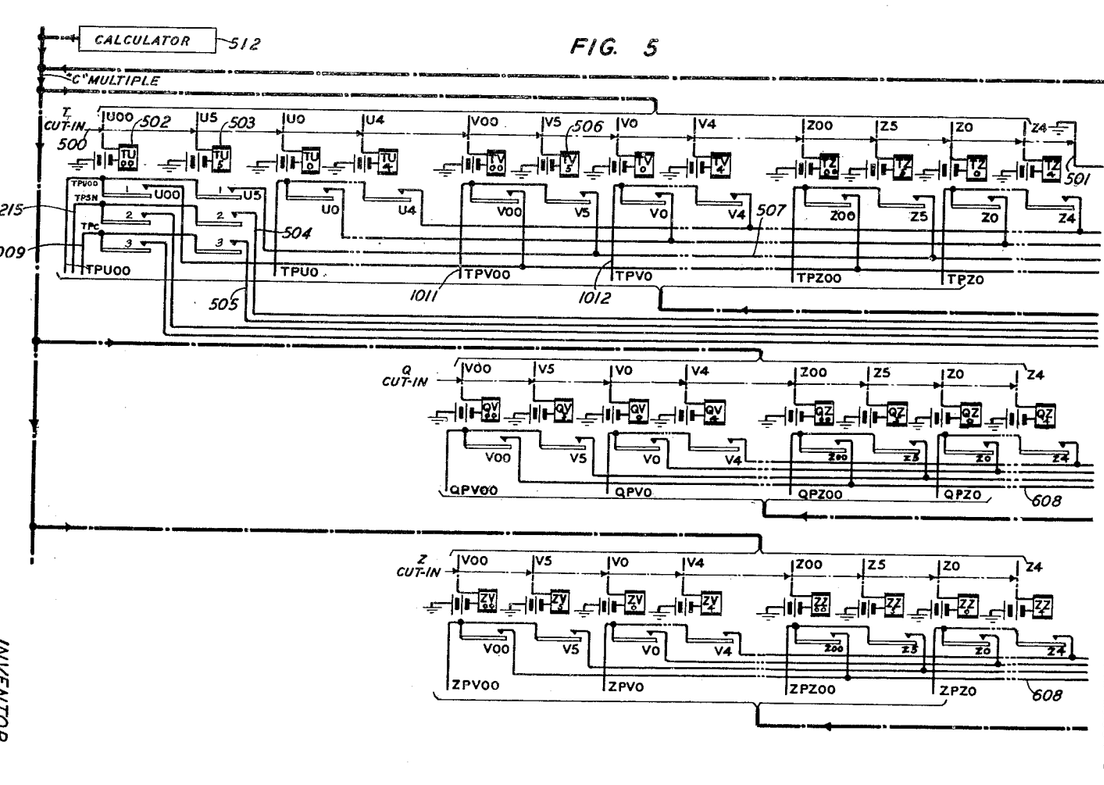
Fig. 5 shows in part the T, Q and Z registers.

A succeeding order will be the grounding of the PDTQZ lead which orders the argument values recorded in the problem data tape to be read off and registered in the T, Q and Z registers. The code lead PDTQZ is shown (in Fig. 12) as the conductor 1207 and may be traced through the armature 3 and back contact of the EP-2 relay 1002, conductor 1003, the back contact and armature 8 of the RC-1 relay 900. Now it may be noted that at the start of operations the problem data tape has been moved until it has encountered a five hole code which precedes each block of information recorded in such tape. Therefore the ER relay 904 and its companion ER-1 relay 905 will be operated at this time so that the ground on the PDTQZ lead at armature 8 of relay 900 will be extended over the front contact and armature 3 of ER-1 relay 905 to the winding of the T relay 906. Now through further means not shown here the PDTQZ lead causes the T register cut-in relay indicated by the horizontal line 500 to be operated (and after the T register has been filled, then the Q register cut-in relay and finally the Z register cut-in relay) so that a ground is extended over conductor 501 the front contact and armature 4 of the T relay 906 to the chain start lead where it may be traced through the armature 1 and front contact of relay 906 to the winding of U relay 907. This relay operates and causes the operation of the U-1 relay 908 whereupon the translator relays set from the problem data tape 909 will transmit to the U order of the T register. This is sufficient to indicate how in response to an order issued by the master control circuit, the arguments of a problem may be read off of the problem data tape and recorded in the T, Q and Z registers. Thereafter other orders issued will steer the operations of the device to perform certain calculations. It need now only be noted that eventually the calculator 502 will derive a number which may also (the T register in the meantime having been emptied) be registered in the T register.

In connection with the present invention it may be noted that any numbers read from the problem data tape into the T register will certainly be in their normal form and hence no special provisions have to be made in connection with such numbers. Therefore when such numbers are to be printed the master control circuit will issue an order (PTU) which will result in the digits being read from the T register to the printer without change, starting from the U order thereof.

However, a number which was registered in the T register from the calculator 502 may be either in its normal form or in its complemental form and hence a code (PTV±) is provided to automatically warrant that the number will be printed in its normal form.

Let us now assume, by way of example, that the digits 9, 8, 7, 6, 5 and 4 are registered in the U, V, W, X, Y and Z orders of the T register respectively and that these digits have been transmitted there from the calculator 502. This number, the end result of a calculation, is to be printed. The routine tape will therefore transmit an order which will result in the grounding of the PTV± code lead shown in Fig. 12 as conductor 1208. Ground on this lead will be extended over armature 3 and back contact of EP-1 relay 1200, the normal contacts of armature 5 of PT-5 relay 1209, and thence to the winding of relay 1209 and battery. Relay 1209 responds and locks to conductor 1210 which is grounded at armature 2 of ST-4 relay 1118 (Fig. 11) under control of the end of progress EP relay 1000. The original ground on conductor 1208 is now extended by armature 6 of relay 1209 to conductor 1211 where it will remain until this operation is completed and the EP-1 relay 1200 is operated.

Upon the operation of relay 1209 ground will be extended over armature 4 and front contact of relay 1209 to the start conductor 1212, to be extended through the normal contacts of armature 1 of CD relay 1213 to the winding of ST relay 1214. This relay responds and temporarily opens the connections to the steering chain selecting relays (T-6, T-5, T-3, Q, Z and CR) until a check has been made to see that the circuit is in proper condition.

Thus the winding of the CD relay 1213 is connected by armature 1 of ST relay 1214 to a series circuit involving an armature and back contact of each of the steering chain selecting relays and each one of the steering chain relays to a ground on armature 1 of CH-1 relay 1004. If all of these relays are, as they should be, released then CD relay 1213 will respond, will lock to the ground on the start conductor 1212 and will release the ST relay 1214. The T-5 relay 1005 will now be operated from armature 3 of PT-5 relay 1209. Through armature 2 of PT-5 relay 1209 ground is extended to TPSN conductor 1215 which may be traced to armature 2 of the binary TU-OO relay 502 and TU-5 relay 503. Since I have assumed that the digit 9 is registered here, the TU-5 relay will be operated and this ground will be extended over conductor 504 to operate the NG relay 600 which will invert each of the digits transmitted from the T register to the translator of Fig. 6.

Upon the operation of CD relay 1213 and the subsequent release of ST relay 1214, ground on armature 9 of ST relay 1214 is extended over the front contact and armature 9 of CD relay 1213 to the windings of EP-2 relay 1002 and EP-1 relay 1200. The ground on conductor 1211 is now extended over the front contact and armature 9 of EP-1 relay 1200 to conductor 1216 leading to STP-M relay 1007 which responds and grounds the STP conductor 1204. This constitutes a satisfaction signal to the master control circuit which will therefore advance and order some other circuit operation to be performed while this printing operation is being carried out. As soon as the master control tape advances ground is removed from conductor 1208 and the STP-M relay 1007 is released.

In the master control circuit the ST-4 relay 1118 places a ground on conductor 1119 which may be traced through armature 8 and back contact of ST relay 1214, front contact and armature 8 of CD relay 1213 the chain start lead 1217 for the steering chain of Fig. 10 which leads to CH-1 relay 1004. This relay responds and transfers the down check ground on its armature 1 to a chain circuit leading to conductor 1006 leading through the normal contacts of armature 2 of CD-1 relay 705 to the winding of ST-1 relay 706. Again a check is made by connecting the winding of CD-1 relay to a chain circuit involving an armature and back contact of each of the relays, STP-707, W-708, Z1-709, LTRS-710, ±-711, LF-712, CRA-713, SPA-714 and the biquinary translator relays P4-601, P3-602, P2-603, P1-604, P0-605, P5-606 and P00-607 to ground. If all of these relays are, as they should be, released, then CD-1 relay 705 will respond, lock to the ground on conductor 1006 and release ST relay 706.

Figure 8:
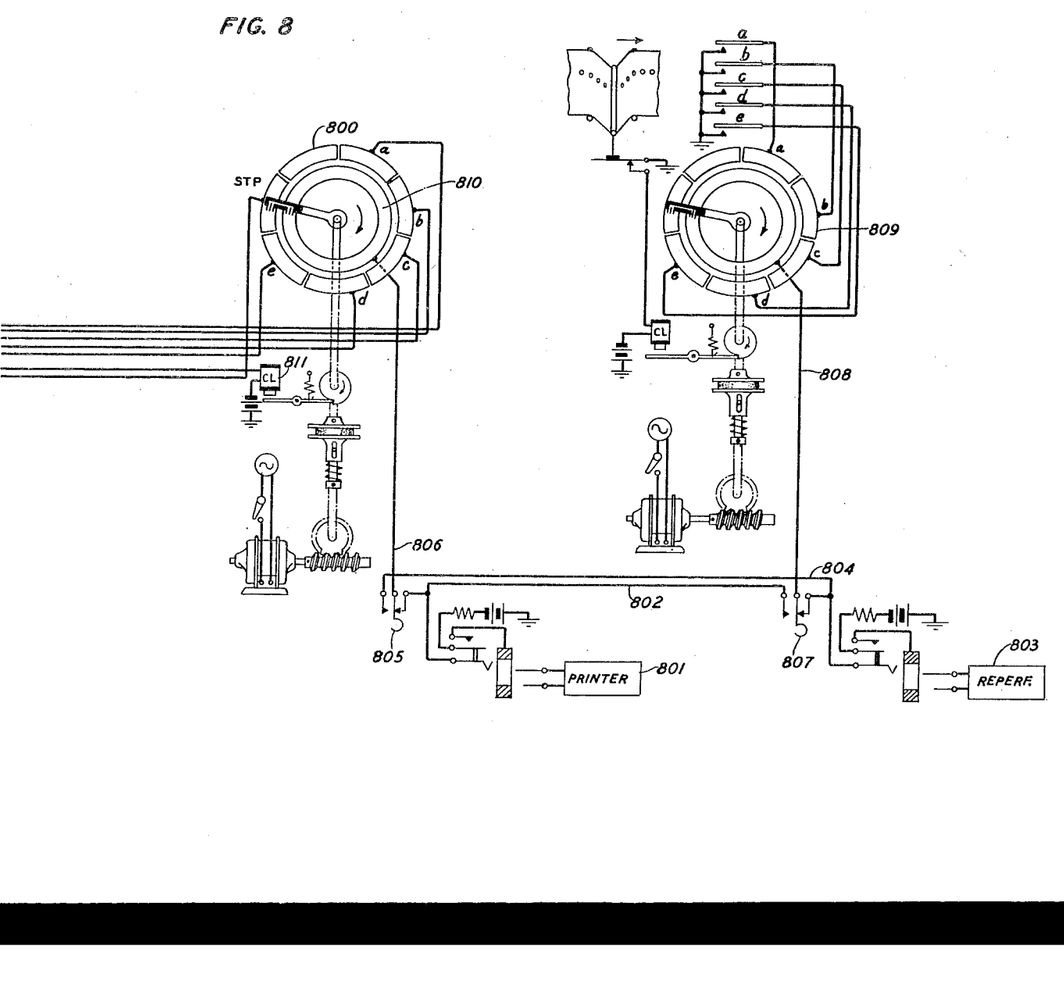
Fig. 8 shows the distributors for translating the selective characterization of five leads into the conventional time spaced impulses for operating the the printing telegraph apparatus including a conventional printer and reperforator.

The conductors 715 and 716 are now grounded. Conductor 715 is extended through armature 4 and front contact of CH-1 relay 1004, armature 10 and front contact of T-5 relay 1005, conductor 1003 the winding of ± relay 711 to battery and relay 711 responds. Ground on conductor 716 is extended over armature 5 and front contack of CH-1 relay 1004, armature 11 and front contact of T-5 relay 1005, TPC conductor 1009 to the armatures 3 of binary relays 502 and 503 and since relay 503 is operated to conductor 505, armature 2 and front contact of CL-1 relay 702, conductor 717, thence over armatures 5 and 6 of ± relay 711 to ground the *a* and *c* conductors leading the *a* and *c* segments of the transmitter distributor 800.

In Fig. 8 there is shown schematically a printer 801 which by a jack and plug arrangement may be connected to a line 802 and a reperforator 803 which by a similar arrangement may be connected to a line 804. By means of a key 805 the line 806 coming from the distributor 800 may be switched from its normal connection to the line 802 to the line 804. The key 807 will similarly switch the line 808 coming from the distributor 809 from its normal connection to line 804 to the line 802. The two keys 805 and 807 may be mechanically connected to act together. Thus either the printer 801 or the reperforator 803 may be connected to receive from either distributor. The distributor 809 may be used to print from a prepared tape and is thus useful for checking purposes and for preparing duplicate tapes.

With the terminals of the printer 801 plugged into the jack 805 a circuit is established from battery, the printer the ring 810 of the distributor, the stop segment thereof on which the brush rests when not in motion the winding of CP relay 718 to ground. Relay 718 is therefore operated when the circuit is ready to carry out a printing operation. Therefore upon the operation of ± relay 711 a ground is extended to the ST-2 conductor 719. With relay 718 operated this ground will be extended over armature 2 and front contact of relay 718, armature 2 and back contact of Z1 relay 709 the winding of W relay 708 to battery and relay 708 will respond and lock to conductor 719. This will close a circuit from the ground on conductor 719 over armature 1 and front contact of CP relay 718, armature 1 and back contact of Z1 relay 709, armature 1 and front contact of W relay 708 to the clutch magnet 811 of the desirtbutor 800 whereby the distributor is unlatched to make one revolution during which the brush will ride over the start segment, the five code segments and come to rest again on the stop segment. As the brush leaves the stop segment CP relay 718 releases and closes the ground on conductor 719 over its armature 3 and back contact, front contact and armature 2 of W relay 708, the winding of Z1 relay 709 to battery. Relay 709 operates and locks to ground on conductor 719. When the distributor arm has made its revolution and come into contact with the stop segment again, relay 718 will operate and this will now close a circuit from ground on conductor 719, armature 2 and front contact of relay 718, armature 2 and front contact of Z1 relay 709, the winding of STP relay 707 to battery. Relay 707 operates and locks to ground supplied by armature 1 of CD-1 relay 705. Through its armature 2 the STP relay 707 closes the chain start ground used for operating CH-1 relay 1004 to armature 3 thereof and thence to winding of CH-2 relay 1010. Relay 1010 operates and holds CH-1 relay 1004 operated until STP relay 707 releases. With two of the steering chain relays operated, the ground supplied by armature 1 of CH-1 relay 1004 is removed from conductor 1006, whereby CD-1 relay is released. This takes the ground off of conductors 715 and 716 whereby the ± relay 711 is released and the ground on conductor 717 is removed. In turn the ground on conductor 719 is removed so that in turn relays 707, 708 and 709 release. The release of relay 707 opens the circuit for CH-1 relay 1004 and this relay returns to normal thus rendering the CH-2 relay 1010 fully effective.

Figure 6:
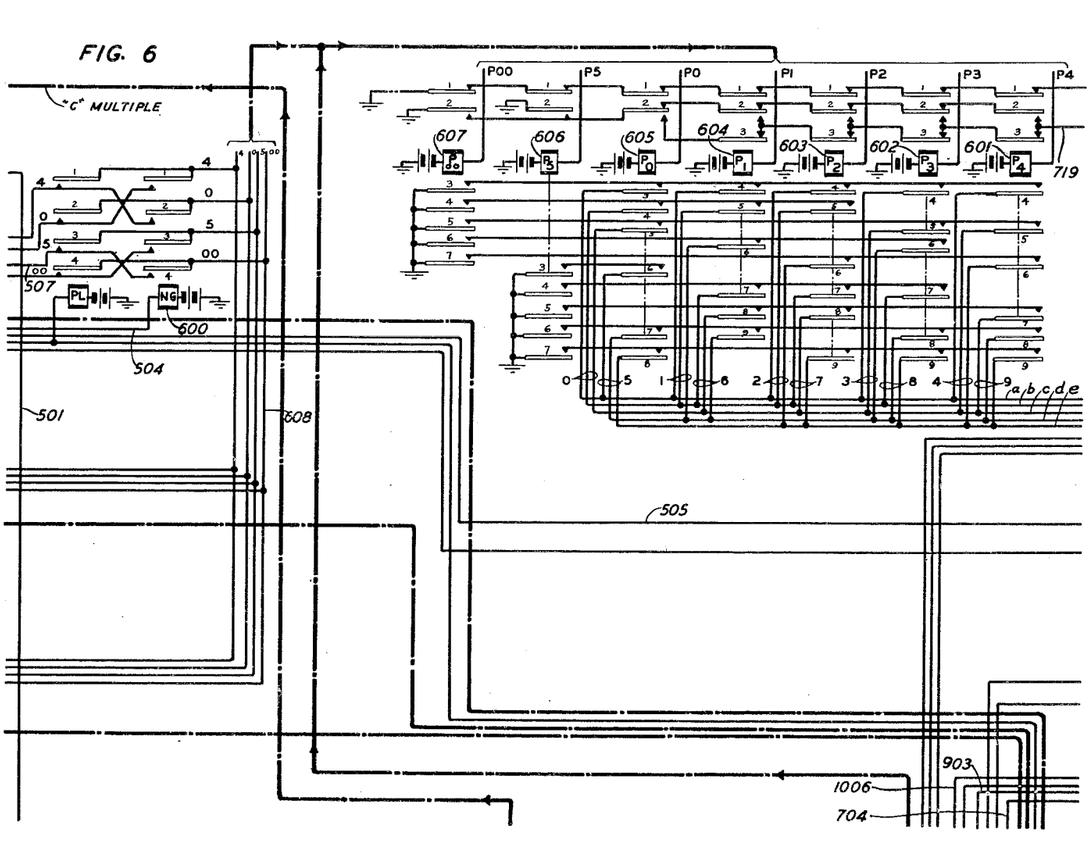
Fig. 6 shows the translator for translating numbers from the biquinary code to the conventional printing telegraph code, together with an inverter for changing such numbers into their nine's complements.

When CH-1 relay 1004 becomes released and CH-2 relay 1010 is operated ground is again placed on conductor 1006 to operate ST-1 relay 706. When the down check circuit starting with the ground on armature 1 of POO relay 607 shows the relays of the translator circuit to be in properly released condition the operations for the printing of the digit in the V order of the T register will be started.

Now it was noted that during the operation of the ± relay 711 that the *a* and *c* conductors leading to the transmitter distributor were grounded. In accordance with the following table of codes it will be seen that a + sign was printed. It may be noted that the digit 9 in the U order of the T register would normally result in the printing of a — sign, but this is reversed since in class 1 operations it is easier to calculate the errors with the wrong sign and to then invert the sign through the contacts of the class relays. In the following table the O represents mark (corresponding to a perforation in a tape) and a blank represents a space.

*Table*

| Character | a | b | c | d | e |
|---|---|---|---|---|---|
| + | | | O | | O |
| — | | | | O | O |
| 0 | O | O | O | | |
| 1 | O | O | | O | |
| 2 | O | O | | | O |
| 3 | O | O | O | O | |
| 4 | O | | | O | O |
| 5 | O | | O | O | O |
| 6 | | | O | O | O |
| 7 | | O | O | O | |
| 8 | | O | | O | O |
| 9 | | | | O | O |
| Space | | | | O | O |
| Carriage return | | | | O | |
| Line feed | | O | | | |
| Letters | O | O | O | O | O |
| . (period) | O | | | | |

After CH-2 relay 1010 has been operated, CH-1 relay has been released and conductors 715 and 716 have again become grounded these ground connections will be extended over armatures 6 and 7 of CH-2 relay 1010 and armatures 8 and 9 of T-5 relay 1005 to the TPVOO and TPVO activate leads 1011 and 1012 leading to the binary group and the quinary group respectively of the V order of the T register. It will be remembered that the digit 8 was assumed to be registered here and hence the TV-5 relay 506 is operated and the ground on TPVOO lead 1011 is extended to the 5 lead 507 but is inverted by the NG relay 609 to ground the OO lead 608 and thus cause the operation of the POO translator relay 607. In the same manner the 3 quinary relay in the T register is operated but since the NG relay 609 is operated the P-1 relay 604 will be operated. Now with relays 607 and 604 operated it will easily be seen that the *a*, *b* and *d* code wires leading to the corresponding segments on the distributor will be grounded so that the figure 1 will be printed.

In like manner the remaining digits 7, 6, 5 and 4 will be transmitted from the corresponding orders of the T register, inverted, translated and printed as the figures 2, 3, 4 and 5 respectively so that the number registered in the T register as 9 8 7 6 5 4 will be printed as

+1 2 3 4 5

If the class 2 relay 701 had been operated instead of the class 1 relay 702 then the printed record would have been

−1 2 3 4 5

After the CH-6 relay 1013 has operated and controlled the printing of the last digit 5 then the following SP-1 relay 1014 will operate. In this case the ground on conductor 715 will be extended to conductor 719 and the ground on conductor 716 will be extended to conductor 1915 which is connected to the c conductor leading to the c segment of the distributor 800 whereby the printer is caused to space. With the class 3 relay 700 normal the printer is caused to space twice more during the operation of SP-2 relay 1016 and SP-3 relay 1017. Finally the EP relay 1000 of the steering chain is operated. The movement of armature 5 of relay 1000 opens the connection between the grounded conductor 1119 and the conductor 1210 to which the PT-5 relay 1209 is locked. This relay then, releases with the result that all the various relays in Figs. 7, 10 and 12 release and return to normal (with the exception of the class relay). The release of relay 1209 opens the holding circuit of CD relay 1213 and the T-5 relay 1005. The release of CD relay 1213 opens the circuit for EP-1 relay 1209, EP-2 relay 1002 and the chain ground on conductor 1217 so that EP relay 1000 releases.

The release of EP-1 relay 1200 closes the printing code leads, such for instance as the PTU3 lead 1218 which orders the printing of only three digits from the U, V and W orders of the T register, so that other printing operations may be ordered. Each of the code leads included in the bracket indicating that it is part of the bundle 1219 is designated by its code which is generally descriptive and which is further set forth in detail in the said Andrews-Vibbard application.

What is claimed is:

1. In a calculating device, a register for temporarily storing a calculated multidigit number whose first digit is employed as a sign indicator, a plurality of class relays for differently deriving the sign of said number from said sign indicator, a printing device for printing signs and numbers responsive to coded voltage signal representations thereof, a translator for translating electrical circuit conditions representing registered digits into coded voltage signals suitable for the operation of said printing device, an inverter interposed in the circuit between said register and said translator under control of one of said class relays for inverting the sign circuit connections between said register and said translator thus changing the sign represented by said first digit into its opposite, a second inverter interposed in the circuit between said register and said translator for inverting the digit circuit connections between said register and said translator thus changing the remaining digits of said number into their complements and means responsive to the electrical circuit conditions indicating the sign represented by the first digit of said registered number for operating said second inverter whereby when the character of the first digit of a finally calculated number indicates that the said number as calculated is registered as a complement it will be inverted and printed in its true form and whereby its sign will be printed in its true form.

2. In a calculating device, a register for temporarily storing a calculated multidigit number whose first digit serves also as a sign indicator, a plurality of class relays for differently deriving the sign of said number from said sign indicator, a printing device for printing signs and numbers responsive to coded voltage signal representations thereof, a translator for translating electrical signals representing registered digits into coded voltage signals suitable for the operation of said printing device, an inverter interposed in the circuit between said register and said translator under control of one of said class relays for inverting the sign circuit connections between said register and said translator thus changing the sign represented by said first digit into its opposite, a second inverter interposed in the circuit between said register and said translator for inverting the digit circuit connections between said register and said translator thus changing the remaining digits of said number into their complements, means responsive to the electrical signals indicating the sign represented by the first digit of said registered number for operating said second inverter, and master control means for selectively (1) invariably operating said second inverter in one way and transmitting electrical signals representing all digits from said register therethrough or (2) transmitting electrical signals representing said first digit through said first inverter and electrical signals representing the remaining digits through said second inverter, whereby said registered number may be selectively (1) printed in its registered form or (2) translated into and printed as a number in its true form preceded by a sign.

ORFEO CESAREO.

REFERENCES CITED

The following references are of record in the file of this patent:

UNITED STATES PATENTS

| Number | Name | Date |
|---|---|---|
| 1,987,326 | Cunningham | Jan. 8, 1935 |
| 1,989,848 | Daly | Feb. 5, 1935 |
| 2,247,906 | Carroll | July 1, 1941 |
| 2,340,741 | Ghertman | Feb. 1, 1944 |
| 2,340,772 | Rubidge | Feb. 1, 1944 |
| 2,348,535 | Goodale | May 9, 1944 |
| 2,365,331 | Boberg | Dec. 19, 1944 |
| 2,433,081 | Watson | Mar. 16, 1948 |